(12) United States Patent
Yang

(10) Patent No.: US 7,164,891 B2
(45) Date of Patent: *Jan. 16, 2007

(54) ROLLER CONSTRUCTION WITH A SENSE OF FEEL FOR A MOBILE NAVIGATION DEVICE

(75) Inventor: Hui-Ping Yang, Lujhu Township, Taoyuan County (TW)

(73) Assignee: Speed Tech Corp., Taoyuan (TW)

( * ) Notice: Subject to any disclaimer, the term of this patent is extended or adjusted under 35 U.S.C. 154(b) by 98 days.

This patent is subject to a terminal disclaimer.

(21) Appl. No.: 10/819,111

(22) Filed: Apr. 7, 2004

(65) Prior Publication Data

US 2005/0227726 A1     Oct. 13, 2005

(51) Int. Cl.
   *H04M 1/00* (2006.01)
(52) U.S. Cl. .................... 455/90.3; 455/550.1
(58) Field of Classification Search .............. 200/4, 200/11, 17 R, 18, 5 R, 6 A; 455/575.1, 550.1, 455/90.3
   See application file for complete search history.

(56) References Cited

U.S. PATENT DOCUMENTS 6,097,964 A * 8/2000 Nuovo et al. ............... 455/566
6,555,768 B1 * 4/2003 Deruginsky et al. ........... 200/4
6,810,265 B1 * 10/2004 Tochihara ................. 455/550.1
6,862,459 B1 * 3/2005 Sawada et al. ........... 455/550.1

* cited by examiner

Primary Examiner—Lester G. Kincaid
Assistant Examiner—Shantell L. Portis
(74) Attorney, Agent, or Firm—Troxell Law Office, PLLC

(57) ABSTRACT

Present invention relates to a roller construction with a sense of feel for a mobile navigation device; more particularly, relates to a construction for a mobile navigation device to produce a sense of feel when rolling the roller. Present invention comprises a conductive ring, a plurality of terminals and a support. The conductive ring is a hollow ring of conductive metal and the outer surface can be covered with insulating material. Each of the terminals comprises a contactor and the terminals are connected with the default circuit. Each of the contactor is plugged into the conductive ring to be electrically connected with it. The support comprises two braces, wherein each comprises a cantilever plugged in from each end of the conductive ring to support it. On rolling the conductive ring, regular interferences are made between the terminals and the conductive ring, or between the conductive ring and the cantilever, to produce a sense of feel.

8 Claims, 11 Drawing Sheets

ROLLER CONSTRUCTION WITH A SENSE OF FEEL FOR A MOBILE NAVIGATION DEVICE

FIELD OF THE INVENTION

The present invention relates to a roller construction with a sense of feel for a mobile navigation device; more particularly, relates to a clear sense of feel made from the mobile navigation device when rolling the roller.

DESCRIPTION OF THE PRIOR ART

As is known, the prior art 'navigation key for a handset' (U.S. Pat. No. 6,097,964, shown in FIG. 11) comprises a roller body 40 with a shaft 41 in the middle. The roller body 40 and the shaft 41 are between a bearing 42 and an encoder 47. A metallic disc 44 and an outer bushing 46 are between the roller body 40 and the encoder 47. A protrusion 45 is on the metallic disc 44. And a locking member 43 is on the outer side of the encoder 47. By the above component, a navigation key is constructed to be a communication interface between the user and the electronic system of the mobile handset.

Although the above 'navigation key for a handset' is used as a communication interface between the user and the mobile, when the navigation key chooses to move forward or backward by the roller body 40, a sense of feel will be made by the protrusion 45 on the metallic disc 44. But, because the feel only comes from one protrusion 45, the feel may not clear when the roller body 40 rolls forward or backward. Accordingly, prior art of 'navigation key for a handset' do not fulfill users' requests.

BRIEF SUMMARY OF THE INVENTION

The purpose for the present invention is to produce a clear sense of feel for the navigation key.

To achieve the above purpose, the present invention is a roller construction with a sense of feel for a mobile navigation device, comprising a conductive ring, a plurality of terminals and a support. The conductive ring is a hollow ring of conductive metal and the outer surface is covered with insulating material. The user rolls the conductive ring on by insulated surface. Each of the terminals comprises a contactor and the terminals are connected with the default circuit. Each of the contactor is plugged into the conductive ring from the end surfaces to be electrically connected with it so that the conductive ring can be indirectly connected with the default circuit on the circuit board through the terminals. The support comprises two braces, wherein each comprises a cantilever plugged in from each end of the conductive ring to support it.

In the first embodiment and the second one, regular interferences are made between the inner surface of the conductive ring and the contactors of the terminals to produce a sense of feel, wherein the inner surface of the conductive ring is uneven in a regular way (by protrusions or openings).

In the third embodiment, the conductive ring comprises leaf springs concaved inwardly at the abdominal region. At least one of the cantilevers comprises an uneven surface (with concave parts and convex parts) so that, on rolling the conductive ring, regular interferences is made between the contactors and the uneven surface of the cantilever to produce a sense of feel.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
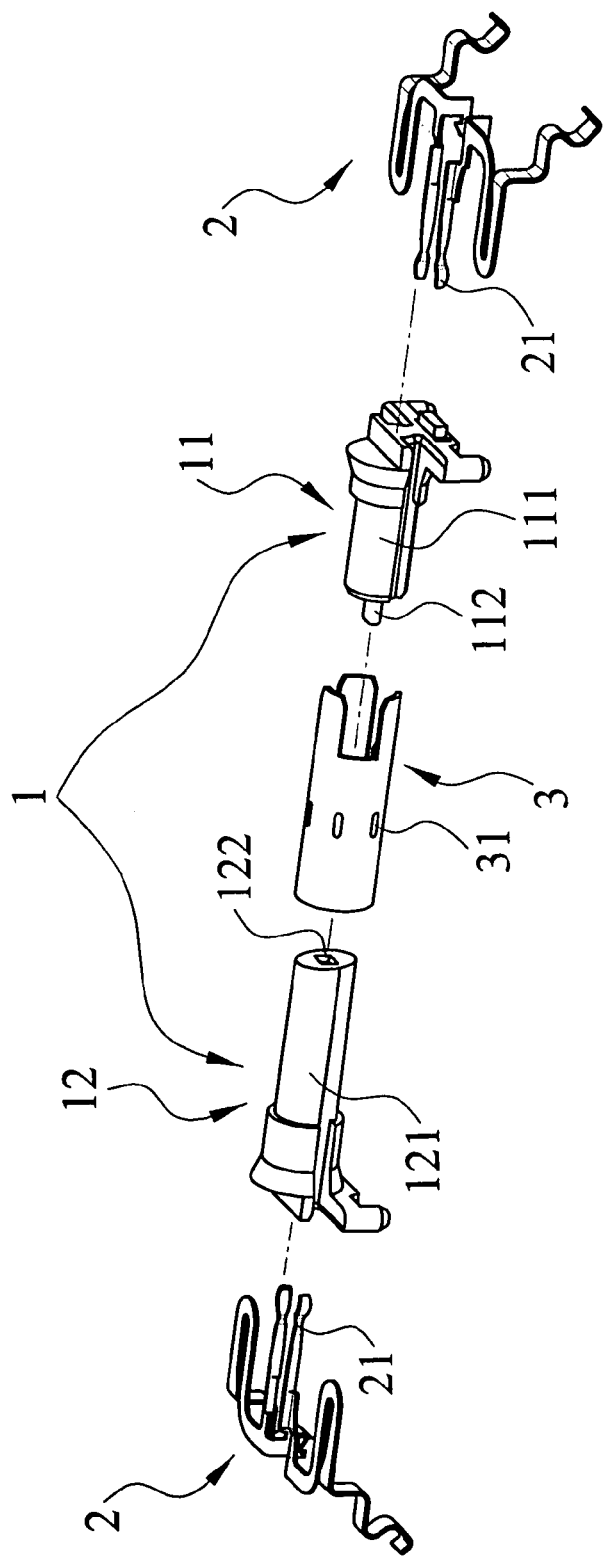
FIG. 1 is an exploded view of the structure of the first embodiment according to the present invention.
Figure 2:
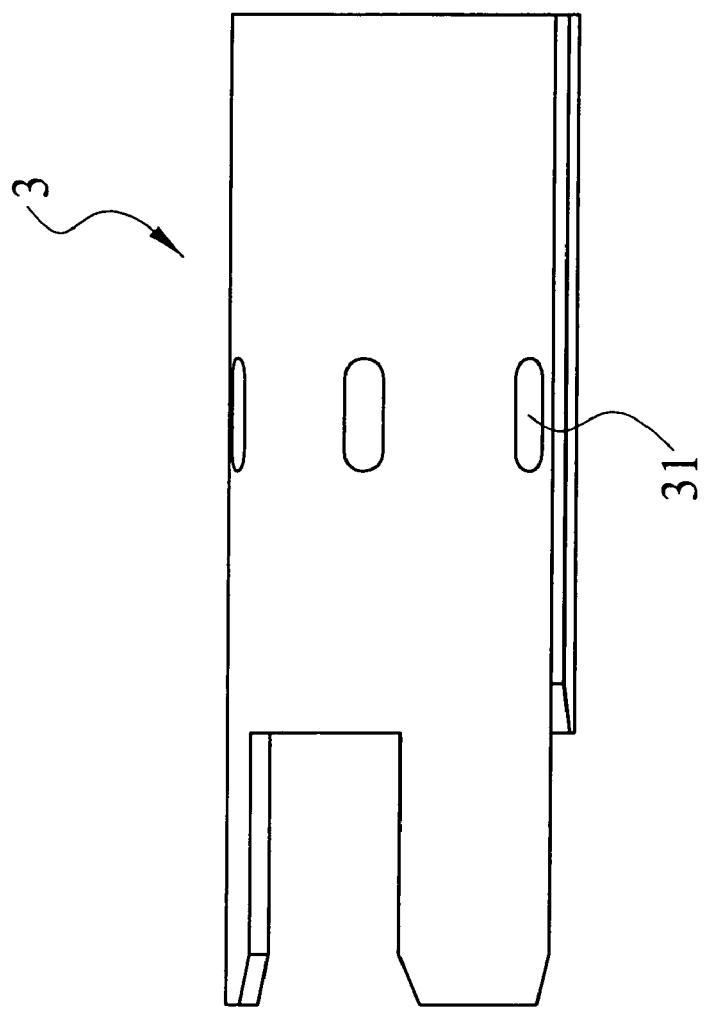
FIG. 2 is a view of the conductive ring of the first embodiment according to the present invention.
Figure 3:
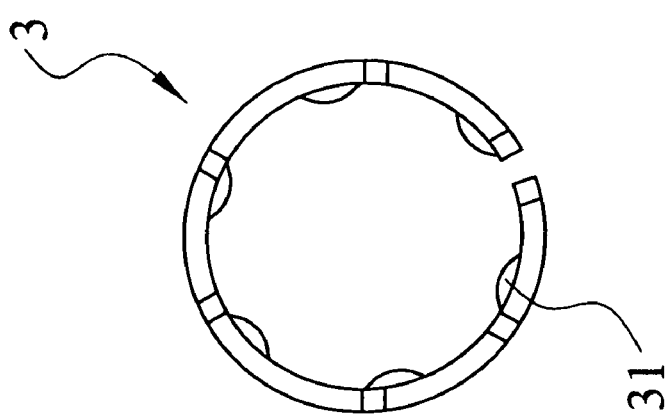
FIG. 3 is a cross-section view of the conductive ring of the first embodiment according to the present invention.
Figure 4:
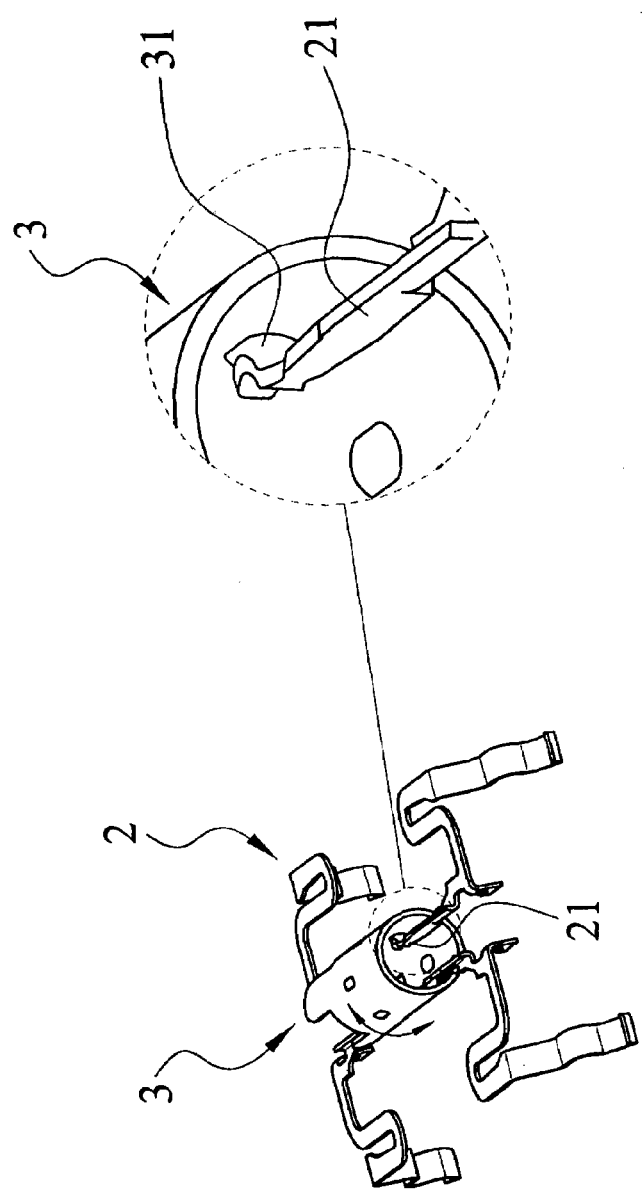
FIG. 4 is a view showing the status of use of the first embodiment according to the present invention.

Please refer to FIG. 1 till FIG. 4, which are an exploded view of the structure, a view of the conductive ring, a cross-section view of the conductive ring, and a view showing the status of use, of the first embodiment according to the present invention. As shown in the figures, present invention is a roller construction with a sense of feel for a mobile navigation device, comprising a support 1, a plurality of terminals 2 and a conductive ring 3, wherein, on rolling the conductive ring 3, interferences are made between the terminals 2 and the conductive ring 3 to produce a sense of feel.

The support comprises two braces 11, 12, wherein each comprises a corresponding cantilever 111, 121 and an end of one brace 11 comprises a fixture projection 112 and an end of another brace 12 comprises a fixture hole 122 to fix with the fixture projection 112.

The terminals 2 are made of copper, wherein each terminal 2 comprises a contactor 21 and the terminals 2 are at both sides of the support 1 and the contactors 21 are at both sides of the braces 11, 12 and the terminals 2 are electrically connected with the default circuit.

Two cantilevers 111, 121 are plugged into the conductive ring 3 from both end surfaces to sustain it. The contactors 21 are plugged into the conductive ring 3 to produce prestress on it and be electrically connected with it. The conductive ring 3 is a hollow ring of conductive metal and comprises a lumpy inner surface with protrusions 31 uniformly distributed to form a circle. And the contactors 21 and the protrusions 31 butt each other.

Please refer to FIG. 4. On actual application, the conductive ring 3 is slipped into a roller body (not shown in the figure). When the roller body rolls, the conductive ring 3 rolls too that the contactors 21 butted with the protrusions 31 are plucked and then restored to produce a clear sense of feel. And by the interfering and the butting between the conductive ring 3 and the terminals 2 which are of the same material as the conductive ring 3, usage period may be prolonged.

Figure 5:
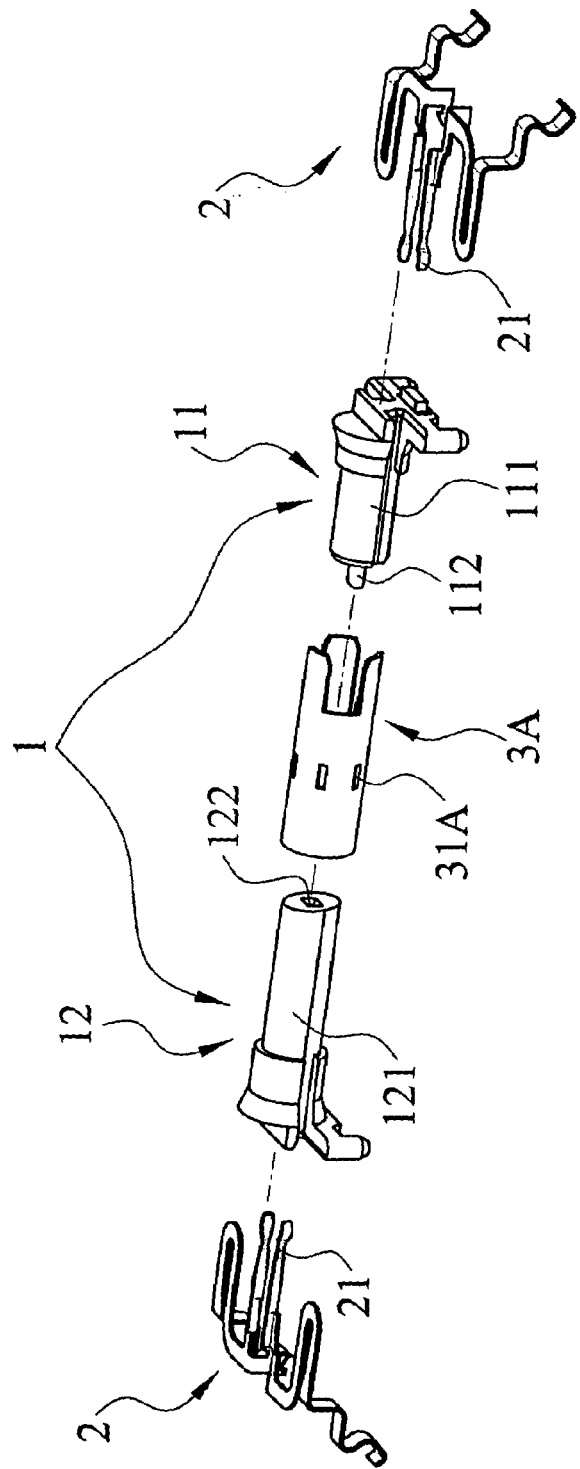
FIG. 5 is an exploded view of the structure of the second embodiment according to the present invention.
Figure 6:
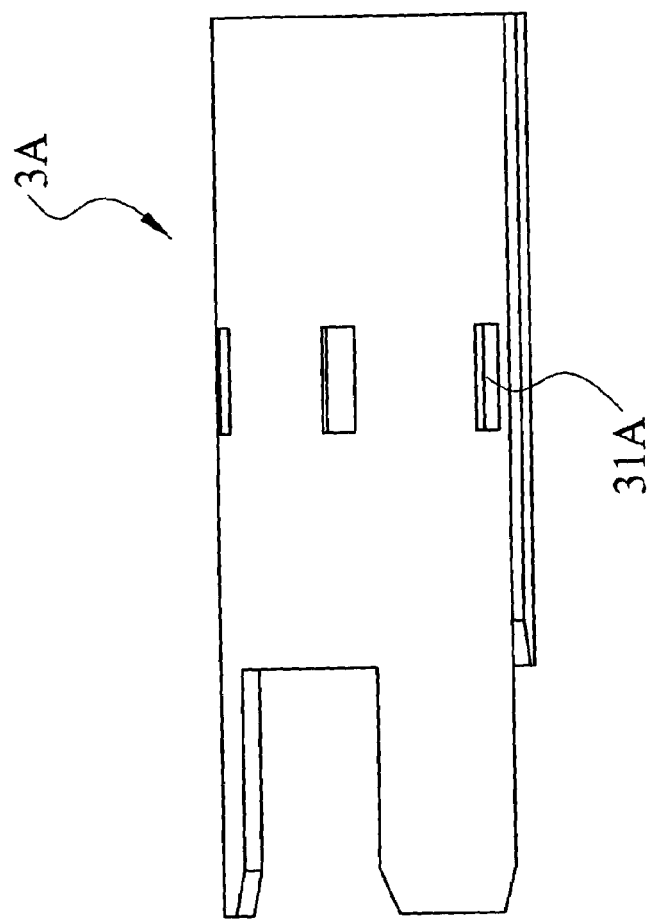
FIG. 6 is a view of the conductive ring of the second embodiment according to the present invention.
Figure 7:
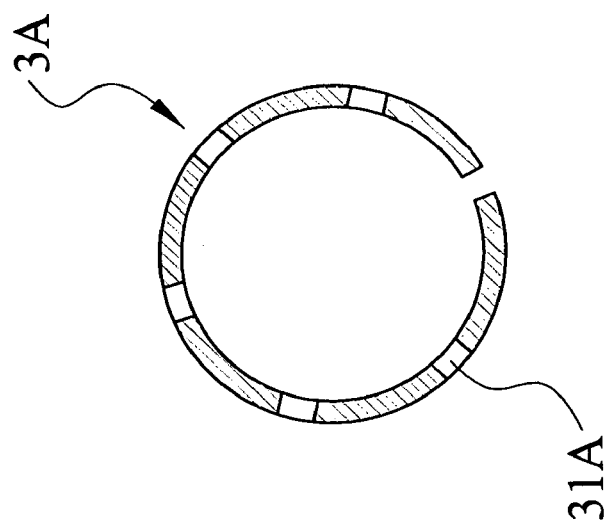
FIG. 7 is a cross-section view of the conductive ring of the second embodiment according to the present invention.
Figure 8:
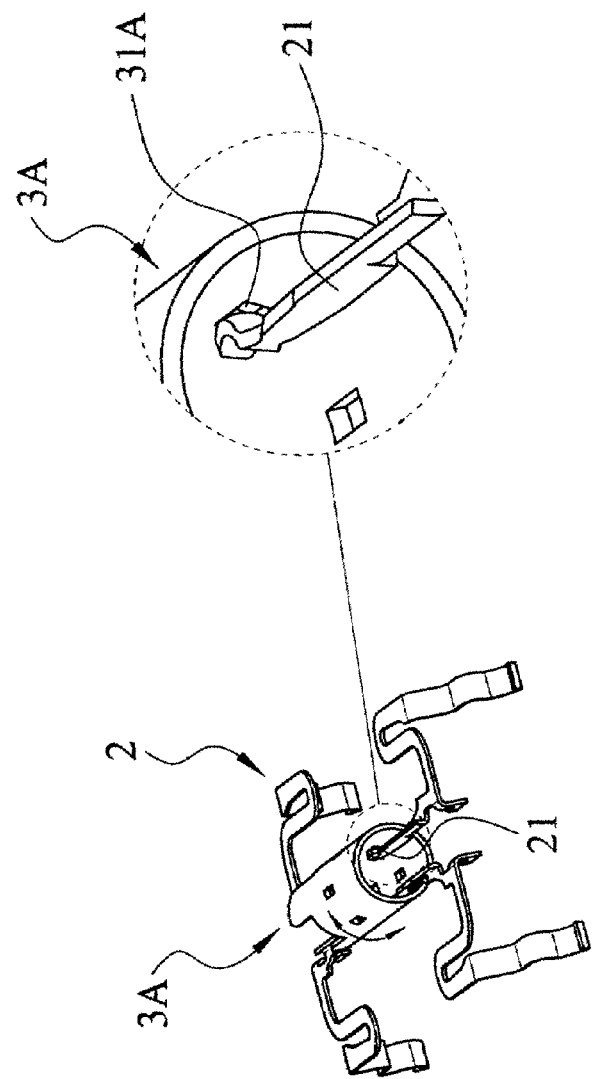
FIG. 8 is a view showing the status of use of the second embodiment according to the present invention.

Please refer to FIG. 5 till FIG. 8, which are an exploded view of the structure, a view of the conductive ring, a cross-section view of the conductive ring, and a view showing the status of use, of the second embodiment according to the present invention. As shown in the figures, the support comprises two braces 11, 12, wherein each comprises a corresponding cantilever 111, 121 and an end of one brace 11 comprises a fixture projection 112 and an end of another brace 12 comprises a fixture hole 122 to fix with the fixture projection 112.

The terminals 2 are made of copper, wherein each terminal 2 comprises a contactor 21 and the terminals 2 are at both sides of the support 1 and the contactors 21 are at both sides of the braces 11, 12 and the terminals 2 are electrically connected with the default circuit.

Two cantilevers 111, 121 are plugged into the conductive ring 3A from both end surfaces to sustain it. The contactors 21 are plugged into the conductive ring 3A to produce prestress on it and be electrically connected with it. The conductive ring, 3A is a hollow ring of conductive metal and comprises a lumpy inner surface with openings 31A uniformly distributed. And the contactors 21 and the protrusions 31A butt each other.

Please refer to FIG. 8. On actual application, the conductive ring 3A is slipped into a roller body (not shown in the figure). When the roller body rolls, the conductive ring 3A rolls too that the contactors 21 butted with the protrusions 31A are plucked and then restored to produce a clear sense of feel. And by the interfering and the butting between the conductive ring 3A and the terminals 2 which are of the same material as the conductive ring 3, usage period may be prolonged.

Figure 9:
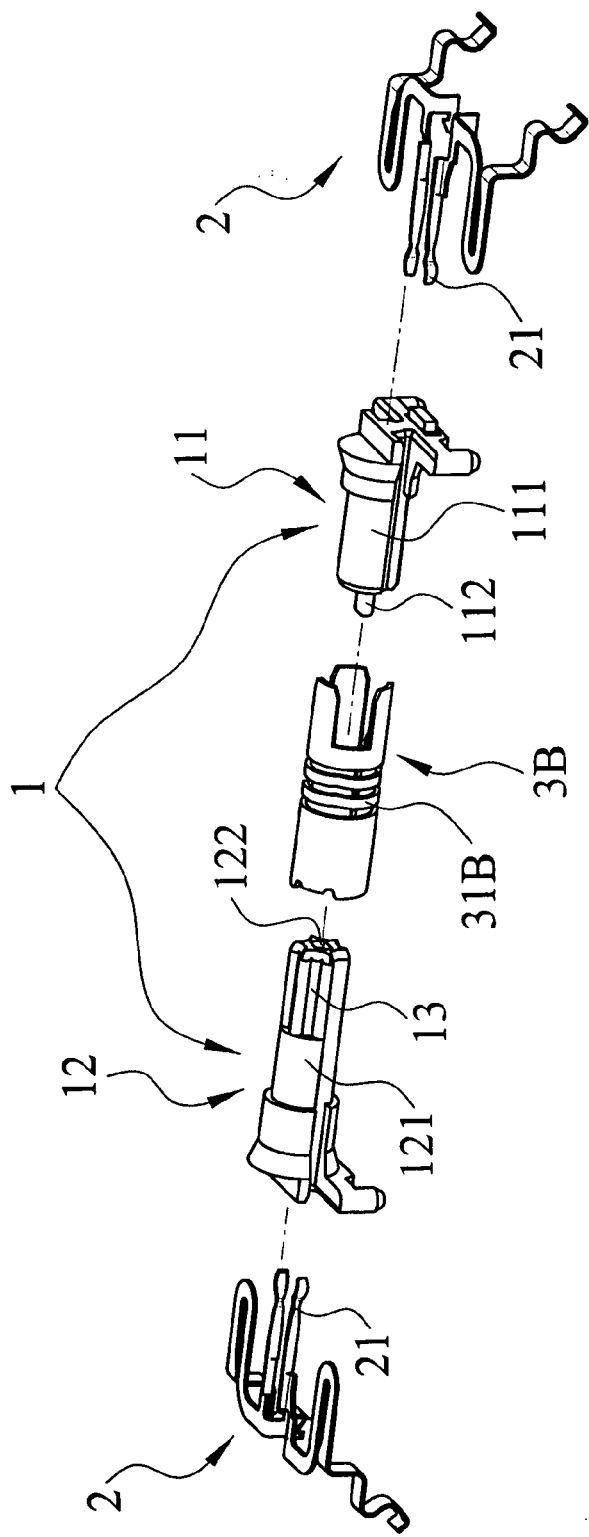
FIG. 9 is an exploded view of the structure of the third embodiment according to the present invention.
Figure 10:
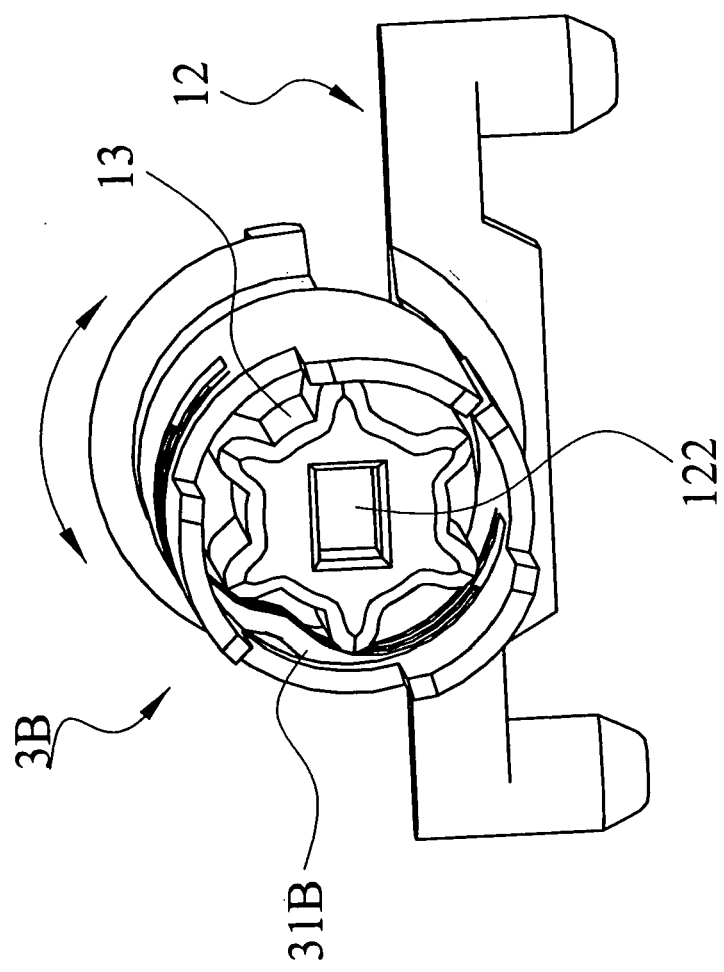
FIG. 10 is a view showing the status of use of the third embodiment according to the present invention.
Figure 11:
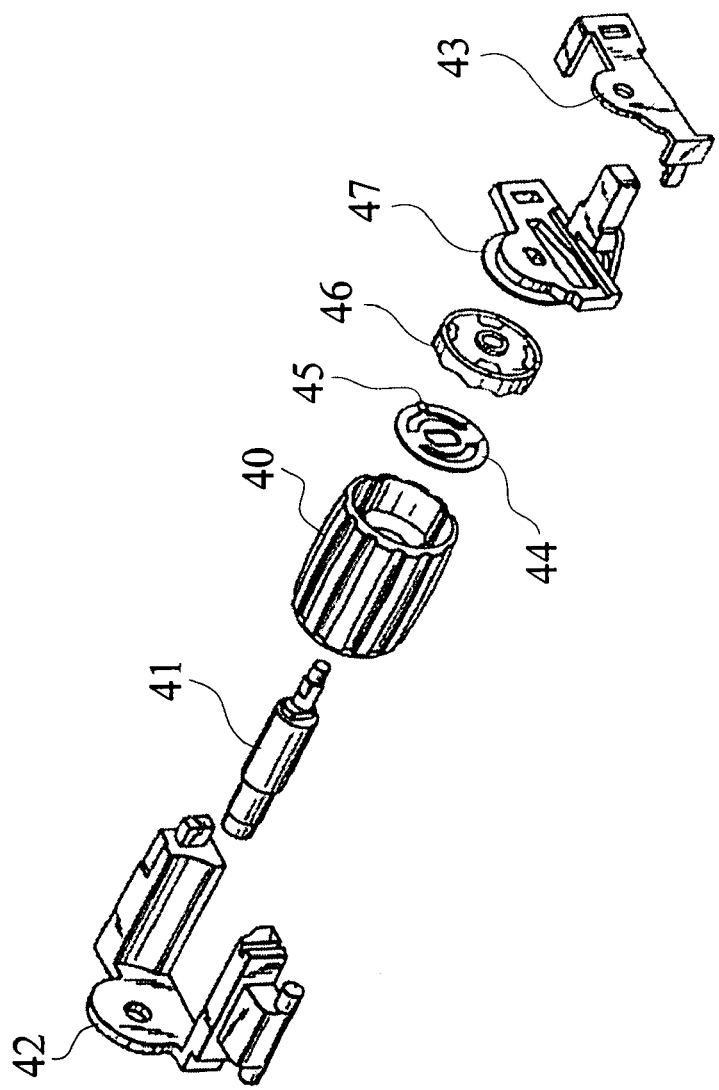
FIG. 11 is an exploded view of the structure of the prior art.

Please refer to FIG. 9 and FIG. 10, which are an exploded view of the structure, and a view showing the status of use, of the third embodiment according to the present invention. As shown in the figures, the support comprises two braces 11, 12, wherein each comprises a corresponding cantilever 111, 121 and at least one of the cantilevers 121 comprises a gear-like surface 13 and an end of one brace 11 comprises a fixture projection 112 and an end of another brace 12 comprises a fixture hole 122 to fix with the fixture projection 112.

The terminals 2 are made of copper, wherein each terminal 2 comprises a contactor 21 and the terminals 2 are at both sides of the support 1 and the contactors 21 are at both sides of the braces 11, 12 and the terminals 2 are electrically connected with the default circuit.

Two cantilevers 111, 121 are plugged into the conductive ring 3B from both end surfaces to sustain it. The contactors 21 are plugged into the conductive ring 3B to produce prestress on it and be electrically connected with it, and the contactors 21 and the inner surface of the conductive ring 3B butt each other. The conductive ring 3B is a hollow ring of conductive metal and comprises a lumpy inner surface with leaf springs 31B which are inwardly concave at the abdominal region and are corresponding to each other to form a circle. And a plurality of clear and regular interferences is made between the leaf springs 31B and the gear-like inner surface 13 of the conductive ring to produce a sense of feel.

Please refer to FIG. 10. On actual application, the conductive ring 3B is slipped into a roller body (not shown in the figure). When the roller body rolls, the conductive ring 3B rolls too that the leaf springs 31B and the gear-like surface 13 butt each other and the leaf springs 31B are plucked and then restored to produce a sense of feel with clear and regular interferences.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A roller construction with a sense of feel for a mobile navigation device, comprising:
    a conductive ring being a hollow ring of conductive metal;
    a plurality of terminals electrically connected with default circuit and electrically connected with the inner surface of said conductive ring by a contactor plugged into said conductive ring; and
    a support comprising two braces each with a cantilever plugged in from each end surface of said conductive ring to sustain said conductive ring,
    wherein the inner surface of said conductive ring is uneven so that, on rolling said conductive ring, a plurality of clear and regular interferences is made between said contactors and said inner surface to produce a sense of feel.

2. The roller construction according to claim 1, wherein an end of one of said braces comprises a fixture projection while an end of another one of said braces comprises a fixture hole to fix with said fixture projection.

3. The roller construction according to claim 1, wherein said uneven inner surface of said conductive ring comprises a plurality of protrusions uniformly distributed to form a circle.

4. The roller construction according to claim 1, wherein a lumpy inner surface of said conductive ring comprises a plurality of openings uniformly distributed to form a circle.

5. A roller construction with a sense of feel for a mobile navigation device, comprising:
    a conductive ring being a hollow ring of conductive metal with a lumpy inner surface;
    a plurality of terminals electrically connected with default circuit and electrically connected with the inner surface of said conductive ring by a contactor plugged into said conductive ring; and
    a support comprising two braces each with a cantilever plugged in from each end surface of said conductive ring to sustain said conductive ring,
    wherein at least one of said cantilevers comprises an uneven surface so that, on rolling said conductive ring, a plurality of clear and regular interferences is made between said cantilevers and said inner surface of said conductive ring to produce a sense of feel.

6. The roller construction according to claim 5, wherein an uneven inner surface of said conductive ring is a gear-like surface.

7. The roller construction according to claim 5, wherein an uneven inner surface of said conductive ring comprises a plurality of leaf springs concaved inwardly at the abdominal region so that, on rolling said conductive ring, a plurality of clear and regular interferences is made between said leaf springs and said inner surface of said conductive ring to produce a sense of feel.

8. The roller construction according to claim 5, wherein an uneven inner surface of said conductive ring comprises a plurality of leaf springs concaved inwardly and said leaf springs are corresponding to each other to form a circle.

* * * * *